US007939009B2

(12) United States Patent
Balboni et al.

(10) Patent No.: US 7,939,009 B2
(45) Date of Patent: May 10, 2011

(54) METHOD AND GROUP FOR THE COMPRESSION MOLDING OF PREFORMS FOR CONTAINERS IN POLYMERIC MATERIAL

(75) Inventors: Alessandro Balboni, Granarolo Dell'Emilia (IT); Fiorenzo Parrinello, Medicina (IT); Zeno Zuffa, Borgo Tossignano (IT)

(73) Assignee: Sacmi Cooperativa Meccanici Imola Societa' Cooperativa, Imola (Bologna) (IT)

( * ) Notice: Subject to any disclaimer, the term of this patent is extended or adjusted under 35 U.S.C. 154(b) by 485 days.

(21) Appl. No.: 11/664,508

(22) PCT Filed: Sep. 9, 2005

(86) PCT No.: PCT/IB2005/002671
§ 371 (c)(1),
(2), (4) Date: Apr. 3, 2007

(87) PCT Pub. No.: WO2006/040631
PCT Pub. Date: Apr. 20, 2006

(65) Prior Publication Data
US 2008/0026239 A1    Jan. 31, 2008

(30) Foreign Application Priority Data
Oct. 12, 2004    (IT) .............................. RE2004A0127

(51) Int. Cl.
*B29C 49/02*    (2006.01)
*B29C 43/02*    (2006.01)
*B29C 43/54*    (2006.01)
(52) U.S. Cl. ..... 264/523; 264/313; 264/319; 264/328.7; 264/535; 425/412; 425/528

(58) Field of Classification Search ................. 425/552, 425/533; 264/313, 314, 328.7, 297.5, 297.6; B29C 43/02, 43/54
See application file for complete search history.

(56) References Cited

U.S. PATENT DOCUMENTS
2,962,761 A * 12/1960 Hobson ...................... 425/451.2
(Continued)

FOREIGN PATENT DOCUMENTS
JP    10-337769    12/1998
(Continued)

*Primary Examiner* — Philip C Tucker
*Assistant Examiner* — William P Bell
(74) *Attorney, Agent, or Firm* — Browdy and Neimark, PLLC (57) ABSTRACT

The preform is formed by an upper neck which maintains unchanged its form in the final object and a hollow body, joined to the neck. The method foresees the insertion, within a matrix cavity, of a metered body of polymeric material whose mass is metered according to a reference value, and the subsequent pressure insertion of a punch within the matrix cavity until it closes the mold's molding chamber, the punch conferring the shape to the inner surface of the preform and the matrix having an inner surface which confers the shape to the outer surface of the preform. According to the invention, in the molding of the preform, the error of the mass of the metered body with respect to the reference value is distributed in the hollow body, which undergoes a subsequent hot deformation until it achieves the final shape. In the mold, the matrix comprises at least one deformable wall (31) whose inner surface defines at least part of the inner surface of the matrix part intended to give form to the hollow body of the preform, said deformable wall (31) having, at least in part, a relatively thin thickness which permits it to be elastically deformed under the pressure of the polymeric material in the final preform molding step, thereby varying the thickness of the hollow body.

5 Claims, 9 Drawing Sheets

U.S. PATENT DOCUMENTS

| | | | |
|---|---|---|---|
| 2,981,976 A * | 5/1961 | Maier | 425/417 |
| 3,375,553 A * | 4/1968 | Criss | 425/587 |
| 4,147,748 A * | 4/1979 | Saumsiegle | 264/523 |
| 5,480,606 A * | 1/1996 | Julian | 264/328.7 |
| 5,989,007 A | 11/1999 | Ingram et al. | |
| 6,736,628 B1 | 5/2004 | Zuffa | |

FOREIGN PATENT DOCUMENTS

| | | |
|---|---|---|
| WO | WO 03072333 A1 * | 9/2003 |
| WO | WO 2006/040627 A2 | 4/2006 |

* cited by examiner

METHOD AND GROUP FOR THE COMPRESSION MOLDING OF PREFORMS FOR CONTAINERS IN POLYMERIC MATERIAL

TECHNICAL FIELD

The present invention relates to the compression molding of (semi-finished) preforms intended for the subsequent realisation (typically through stretch blow molding) of concave objects, such as bottles, in polymeric material.

The preform comprises an upper neck which maintains unchanged the shape of the final object and a hollow body, placed below the neck, which is instead dilated until it assumes a much greater capacity and a correspondingly reduced thickness.

PRIOR ART

According to present technique, to form the preform it is first foreseen the insertion, within a rigid metal matrix (in steel) of a metered body of polymeric material whose mass is metered according to a pre-established value such to completely and exactly fill the molding chamber of the mold, and, subsequently, the pressure insertion of a punch within the same matrix cavity until it closes the mold's molding chamber, i.e. the chamber which, when the mold is in closed position, remains between the punch and the inner surface of the matrix and defines the shape of the preform. The punch conferring the shape to the inner surface of the preform and the matrix having an inner surface which confers the shape to the outer surface of the preform.

A technical problem, present in the described technology and connected with said molds, arises from the fact that, in the metering of the body of polymeric material (metering) to be inserted into the matrix (typically through the separation of the body from a continuous and unshaped mass supplied by an extruder means), one inevitably obtains (small) differences in value with respect to the pre-established value, while the volume of the (closed) chamber of the mold, which must be completely and exactly filled with polymeric material to form the preform, is instead constant for each mold; there exists therefore the technical problem of compensating the inexactness of the mass of the metered body with respect to the reference value.

To such end it has been proposed (see for example the publication JP 10-337769) to compensate the mass error (with respect to a reference value) by concentrating it in the zone of the neck of the preform through relative displacements between some parts of the mold, in particular varying some dimensions of a flat collar normally present on the neck, having mainly the function of support of the bottle in some of the operations in which this is subjected.

This solution, while having the merit of transferring the mass error into a formal element which disturbs neither the functionality nor the external aspect of the bottle, presents nevertheless considerable disadvantages. Indeed, said transfer of the mass error of one part of the neck occurs while a mutual (if relatively small) movement takes place among the mold components and while at the same time a cooling of the material occurs. This involves the rising of inner tensions in the zone where the error compensation takes place, which, when the neck subsequently undergoes mechanical stress, for example in the capping step of the bottle, may lead to the breaking or to unacceptable damage of the neck parts themselves.

Moreover, for example, in the case in which, as the Japanese document foresees, said error transferring is localised in a zone where a circular groove is present on the collar of the neck, it occurs that when the collar itself slides along appropriate transfer guides, such groove causes undesirable friction and moreover acts as a receptacle for dirt.

STATEMENT OF THE INVENTION

An object of the present invention is to solve said technical problem through a valid and effective solution.

Another object of the invention is to improve at the same time the thermal exchange between the mold and preform which takes place during the molding and the subsequent solidification of the preform itself, in order to render more rapid such solidification step.

Said and other objects are achieved by the invention herein as characterised in the claims.

The method according to the invention foresees to distribute in the hollow body the mass error of the metered body with respect to the reference value, in the molding of the preform, being further foreseen that the hollow body undergoes a subsequent hot deformation until it achieves the final shape.

When the preform, after its molding, is subsequently cooled, it is possible that the fact of distributing the mass error of the metered body in the hollow body may induce the rising of inner tensions. Nevertheless, since it is foreseen that the hollow body is subjected to a subsequent heating with hot deformation until it achieves the final shape, with such heating all of the possible inner tensions are more or less eliminated. The same is valid in the case in which the preform is not cooled but is maintained at a sufficiently hot temperature, and is deformed until it achieves the final shape.

According to a preferred embodiment, the compensation of the error of the metered body in the preform molding is realised with an elastic deformation of at least one part of the inner surface of the matrix. In such case the reference value of the mass of the metered body is calculated so that, the error taken into account, the metered body has a mass such to always fill the volume in a complete manner, calculated "in unloaded condition" (i.e. in conditions of inactivity of the mold), of the mold's molding chamber and that the error proves to be an excess of polymeric material with respect to the volume of the chamber itself. In the subsequent molding step of the preform, due in fact to the presence of said excess of polymeric material, at least part of the inner surface of the matrix is elastically deformed (to an extent which varies in relation to the size of the error) with respect to the shape that the same possesses "in unloaded condition", consequently increasing the thickness of the hollow body with respect to the thickness value "in unloaded condition", thereby absorbing the error of the metering.

The excess of polymeric material is thus distributed in a homogenous and regular manner in the hollow body of the preform, determining an error in its thickness of a quite modest value (on the order of several hundredths of a millimeter).

When subsequently the preform, and in particular its hollow body, is subject to deformation to achieve the foreseen final shape, said error of the thickness of the hollow body is distributed over a much greater surface and is thus further reduced. In practice, the initial error of the mass of the metered body becomes practically imperceptible in the final bottle, even difficult to perceive with traditional measuring instruments.

The part of the matrix which, as said above elastically deforms, is adapted to resist such deformation to the extent that the polymeric material achieves in the final molding step a pressure of value substantially equal to the pre-established design value.

BRIEF DESCRIPTION OF THE DRAWINGS

Further details of the invention are set out below with the aid of the attached figures which illustrate, as an example, several embodiments of the mold for the molding of the preform.

DETAILED DESCRIPTION OF THE INVENTION

Figure 5:
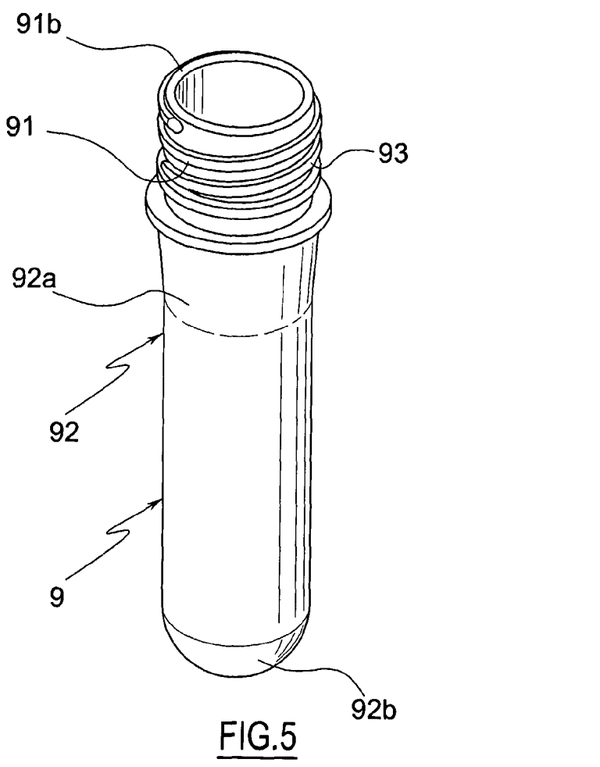
FIG. 5 shows, in perspective view, an example of a preform obtained with the invention.

An example of a preform which is desired to be obtained according to the invention is illustrated in FIG. 5. This preform, indicated with 9, is for realising (typically through stretch blow molding) bottles in thermoplastic resin PET and comprises a neck 91, having the final shape foreseen in the bottle, and a hollow body 92 intended, in the realisation step of the bottle, to form the container body of the same. Generally, the neck 91 is provided with projections which define, for example, a thread 93 projecting radially outward suited to receive a common screw cap. The hollow body 92 has on the other hand a continuous outer surface, generally nearly cylindrical (slightly tapered toward the bottom for delivery reasons) and terminating in the lower end with a more or less spherical cap. In particular, the hollow body 92 comprises a side wall 92a, typically substantially cylindrical, and a bottom wall 92b, typically in the form of a cap.

The preform 9 is obtained with a process of compression molding through the pressure insertion of a punch 11 (male element of the mold) within a closed-cavity hollow matrix (female part of the mold), loaded with a metered body 8 of polymeric material (in particular a thermoplastic resin) at the more or less viscous pasty state, whose mass is metered according to a reference value.

The molding machine which utilises the mold according to the invention is typically but not exclusively of the continuously rotating turntable type, and typically but not exclusively operates with a plurality of equal molding groups which are operated in sequence.

Illustrated in the figures is only a generic mold according to the invention. The machine on the other hand is not illustrated, being per se of traditional type.

The mold according to the invention comprises a matrix and a punch 11. Together, punch 11 and matrix cavity give rise to a molding chamber 7 which confers the desired shape to the preform 9. The cavity of the matrix confers shape to the outer surface of the preform while the outer surface of the punch 11 confers shape to the inner surface of the preform 9.

According to the embodiment illustrated in the figures, the matrix of the mold is formed by:

an upper matrix part 20 having inner surface 21 adapted to form the outer surface of the upper neck 91 of the preform, divided into at least two sectors adapted to be distanced between each other to permit the extraction of the preform 9, a lower matrix part 30 having inner surface adapted to form the outer surface of the hollow body 92 of the preform.

The two upper 20 and lower 30 matrix parts may be separated from each other in the loading step of the metered body 8, which is inserted in the cavity of the only lower matrix part 30; the inner surface areas of said upper 20 and lower 30 matrix parts are adapted, when they are operatively associated to each other, to form the entire cavity of the matrix.

Alternatively, the two matrices are maintained associated to each other also in the loading step of the metered body.

According to the invention, the lower matrix part 30 comprises an undeformable support body 40 which houses at its interior at least one deformable wall 31 realised in steel (or in an equivalent material) whose inner surface defines at least a part of the inner surface of the lower matrix part, having at least a portion in the shape of foil having a relatively thin thickness which permits it to be elastically deformed under the pressure of the polymeric material in the final molding step of the preform so to vary, in particular to increase, the thickness of the hollow body. The deformation of the wall 31 occurs mainly by bending the section along the generic axial plane, together with deformations by traction, while the thickness of the wall does not undergo considerable variations.

Figure 1:
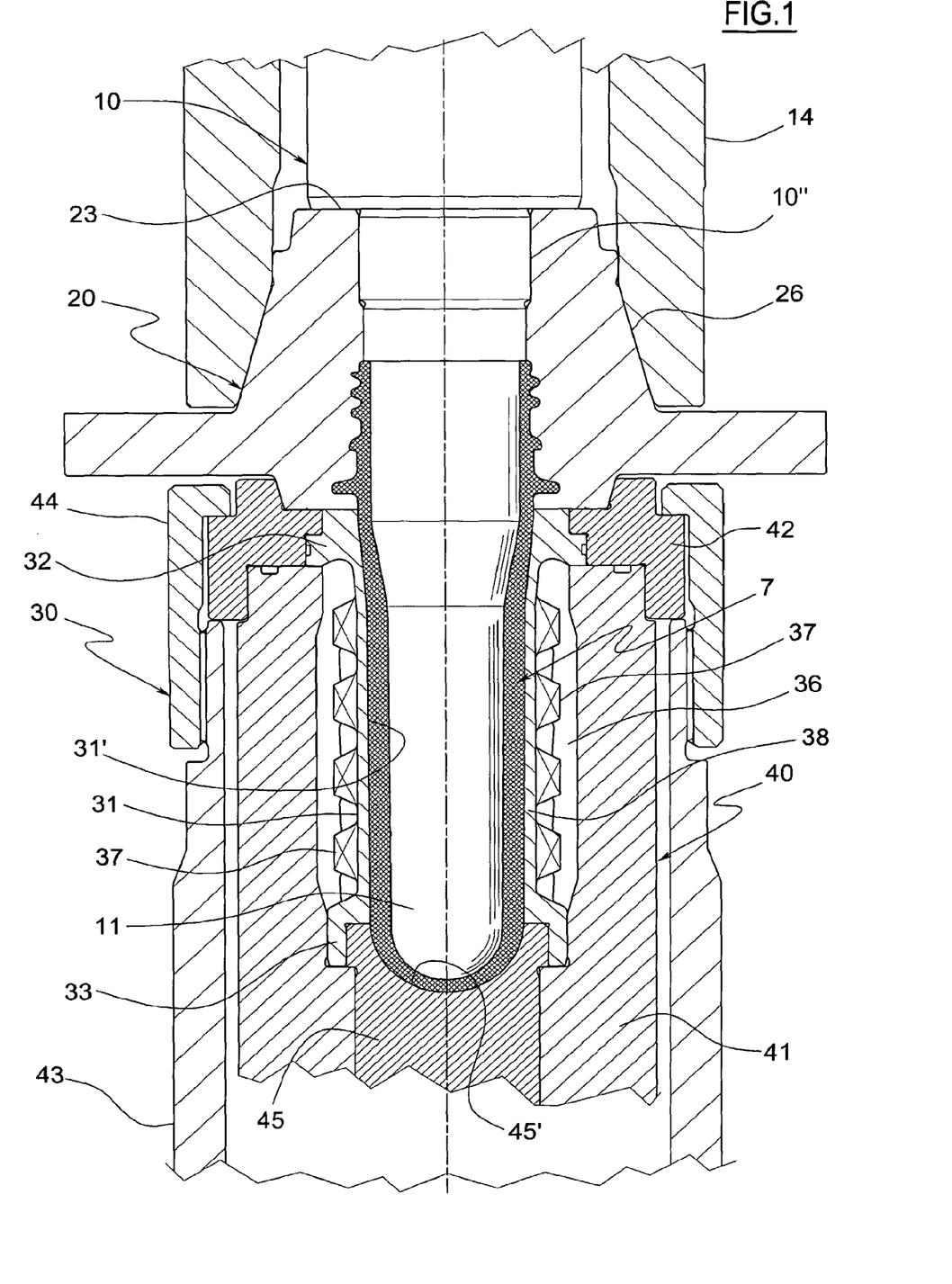
FIG. 1 is an axial section of a first embodiment of the mold according to the invention.

According to the first embodiment, illustrated in FIG. 1, the lower matrix part 30 comprises a portion 38 having tubular form, in particular substantially cylindrical, which defines said deformable wall 31, whose inner surface 31' confers the shape, at least in part (and in particular, as illustrated, almost completely) of the outer surface of the side wall 92a of the hollow body 92, which wall 31 has a relatively thin thickness which permits it to be elastically deformed under the pressure of the polymeric material.

The deformable wall 31 is housed, in particular it is enclosed, within a coaxial cavity 36 made in the support body 40, whose inner surface is placed a distance from the outer surface of the wall 31, such that this may be radially deformed without being hindered by the body 40 itself.

The deformable wall 31 comprises an enlarged section which defines a circular band 32 near the upper end and a second enlarged section, near the lower end, which defines a second circular band 33. Said circular bands 32 and 33 have respective outer cylindrical surfaces 32' and 33' which abut corresponding seats 34 and 35 made in the coaxial cavity 36 of the support body 40; thus defined are two circular radial abutting zones for the wall 31 which also serve for the centring of the wall 31. Said surfaces 32' and 33' are perfectly cylindrical so that the abutting operates only in the radial direction. The upper band 32 also has a shoulder 32a which is blocked in the axial direction by the seat 34.

Along the generic section in the axial plane, the deformable wall 31 comprises, from one side and from the other with respect to the axis, two end portions defined by the circular bands 32 and 33, which form abutments which hinder radial displacement and a central portion, laminar and having a relatively thin thickness compared with the axial length in a single body with the two end portions, free to elastically bend in the radial direction, forming an arch in the axial plane.

In detail, the support body 40 comprises a first tubular body 41 and a second, upper body 42 bound together with the first in monolithic manner by an outer envelope 43 and by an upper closing element 44 associated to the envelope 43. The cavity 36 is made nearly entirely in the lower body 41.

Inside the first body 41 an undeformable central body 45 is placed whose upper surface 45' defines the outer surface of the bottom wall 92b of the hollow body 92. The lower band 33 is also blocked in the axial direction by the respective seat 35. More precisely, a lower shoulder is foreseen near the lower end of the inner wall 31 which comes into contact with the upper end edge of the central body 45 in order to ensure the continuity between the inner surface 31' of the wall 31 and the upper surface 45' of the central body 45.

The cavity 36 is connected, through conduits 46 and others (not illustrated), with means adapted to introduce, circulate and discharge refrigerant fluids capable of removing heat from the preform in a thermal conditioning step (cooling) of the same. The deformable wall 31 lends itself in a particular manner to this end due to the fact that it possesses a relatively thin thickness, which greatly favours the transmission of heat through it.

Moreover, the deformable wall 31 may have different reliefs 37 placed along the outer surface, which define the elements of thermal exchange; these elements are interrupted in the circumferential direction in order not to hinder the elastic radial dilation of the deformable wall 31 in the molding step.

Figure 1A:
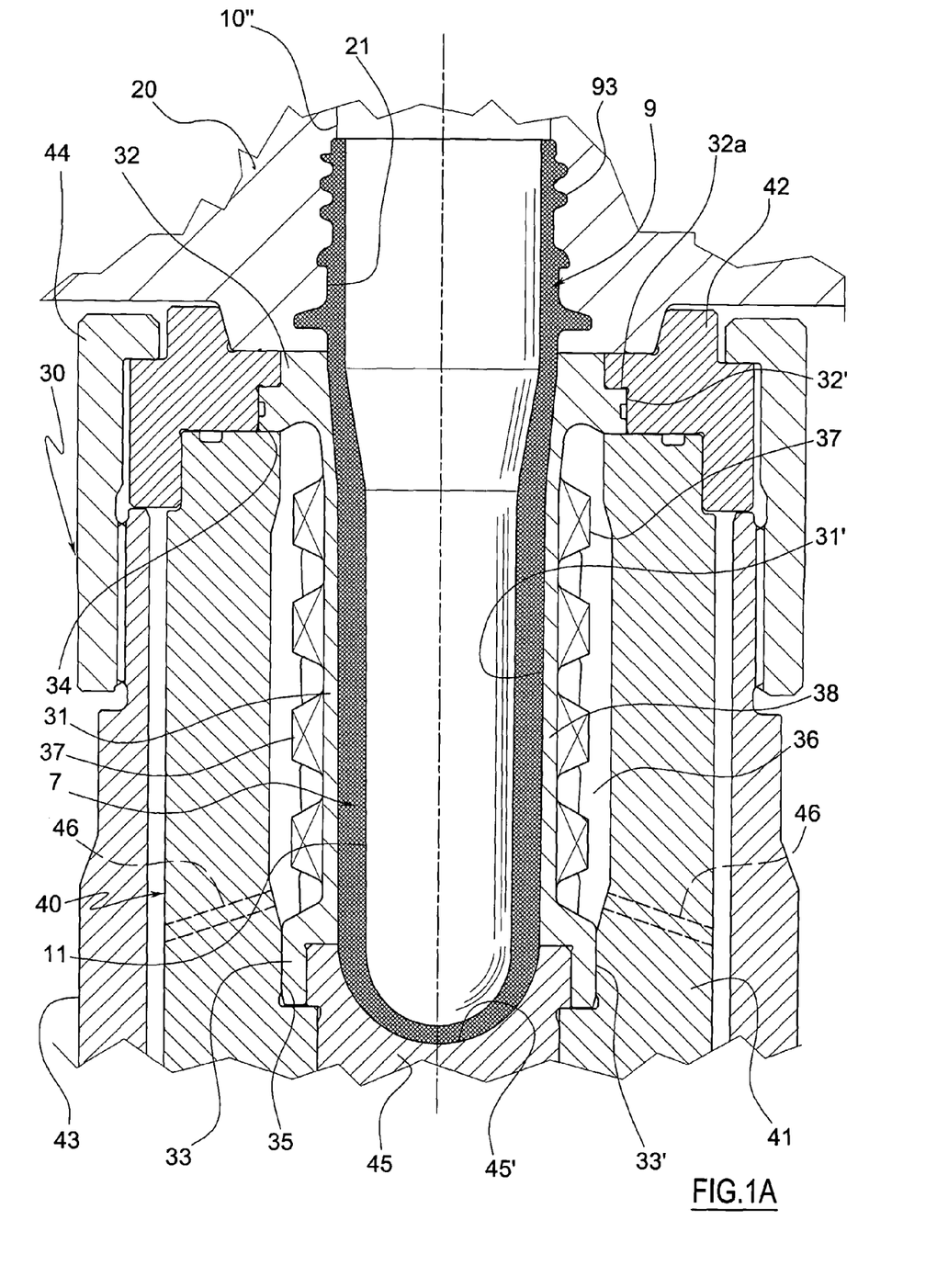
FIG. 1A shows the central part of FIG. 1, in enlarged scale.
Figure 1B:
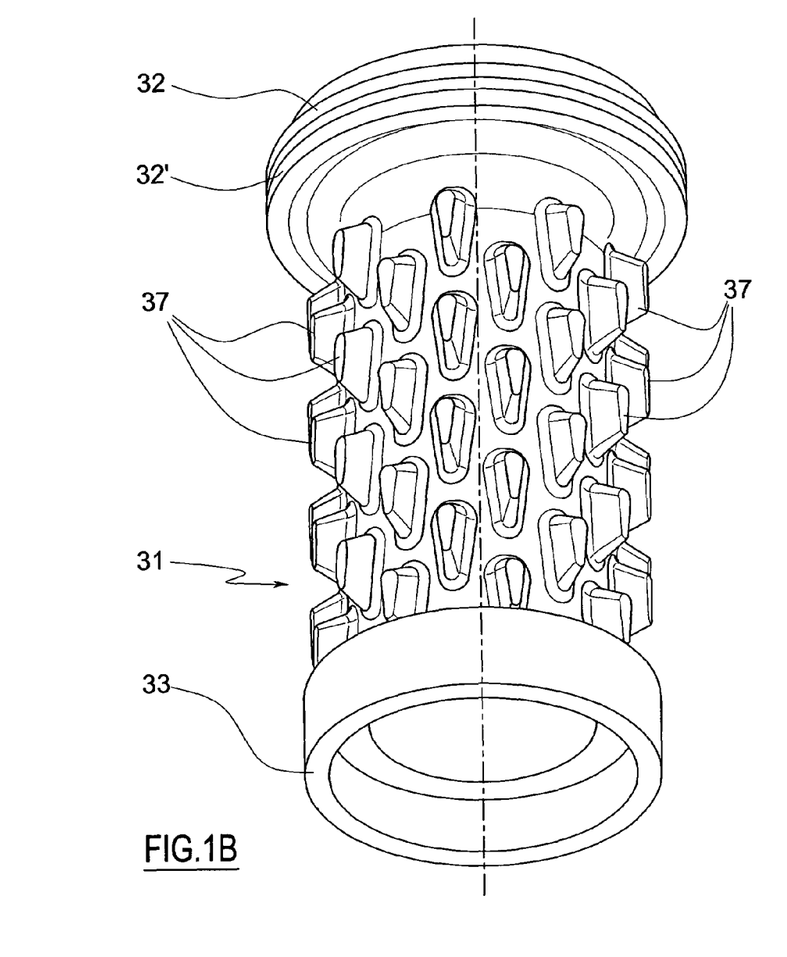
FIG. 1B is a perspective view of the deformable wall 31 of FIG. 1.

In the embodiment illustrated in FIG. 1A e 1B, the reliefs 37 have the shape of fins which project radially and which extend for a distance in the axial direction; these reliefs are moreover placed alternately between one line and the other in order to realise maximum turbulence in the passage of the refrigerant fluid and therefore maximise the thermal exchange with the wall 31.

Figure 1C:
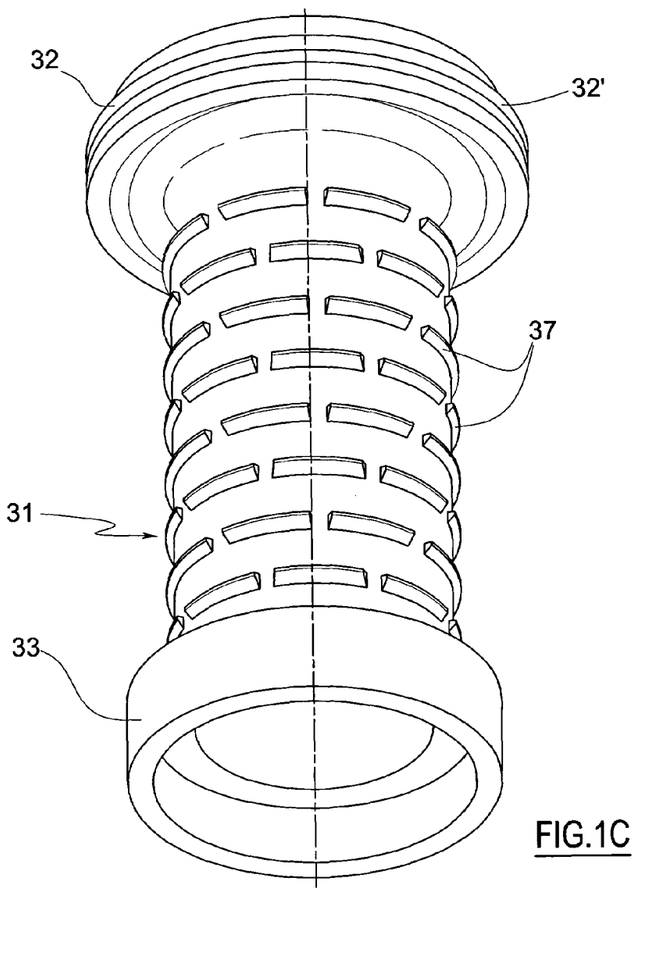
FIG. 1C is a different embodiment of the deformable wall 31 of FIG. 1A.

In the embodiment illustrated in FIG. 1C the reliefs 37 have the shape of rings placed on planes transverse to the axis of the wall 31 and nevertheless interrupted in order to not realise stiffening ribs which may hinder the radial dilation of the wall 31.

There may be foreseen, moreover, appropriate ducts (not shown in the figures) adapted to cool and/or thermoregulate the central body 45 so to cool and/or thermoregulate through such body the lower end portion of the preform.

The punch 11 is integrally fixed to an upper body 10 with which it forms a single body and of which it defines the lower end portion, that which confers shape to the inner surface of the preform. In detail, the upper body 10 comprises a shoulder adapted to abut against the upper end 23 of the upper matrix part 20, and a lower portion 10" which in its lower section is united to the punch 11 itself.

Figure 1D:
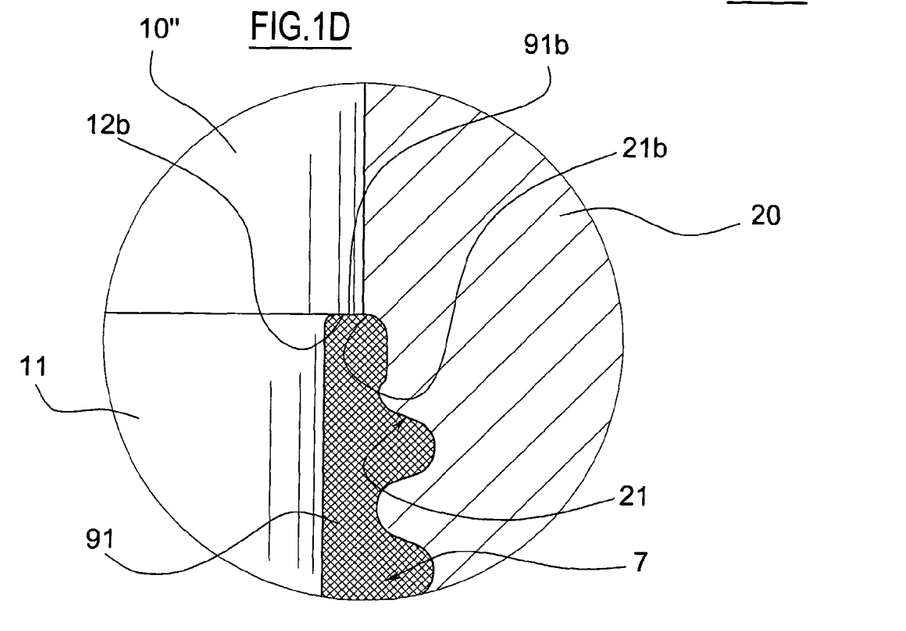
FIG. 1D is an enlarged detail of FIG. 1.

The upper surface 91b of the upper end edge of the neck 91 of the preform 9 is formed in part by a narrow, downward-turned upper surface 21b, which terminates with a substantially horizontal tangent which defines the upper border of the inner surface 21 of the upper matrix part 20, and in part is formed by a narrow upper surface 12b, downward-turned and terminating with a substantially horizontal tangent, which defines the upper border of the outer surface of the punch 11, at the border with the lower end of the lower portion 10" of the upper body 10 (see FIG. 1D).

When the two said upper surfaces 12b and 21b are aligned with each other, the mold is then in closed position, i.e. the punch 11 and the matrix parts 20 and 30 are mutually coupled such that the mold cavity defines the molding chamber 7 in which, between the inner surface of the matrix parts 20 and 30 and the surface of the punch 11, lies defined the shape of the preform.

Figures 2A, 2B:
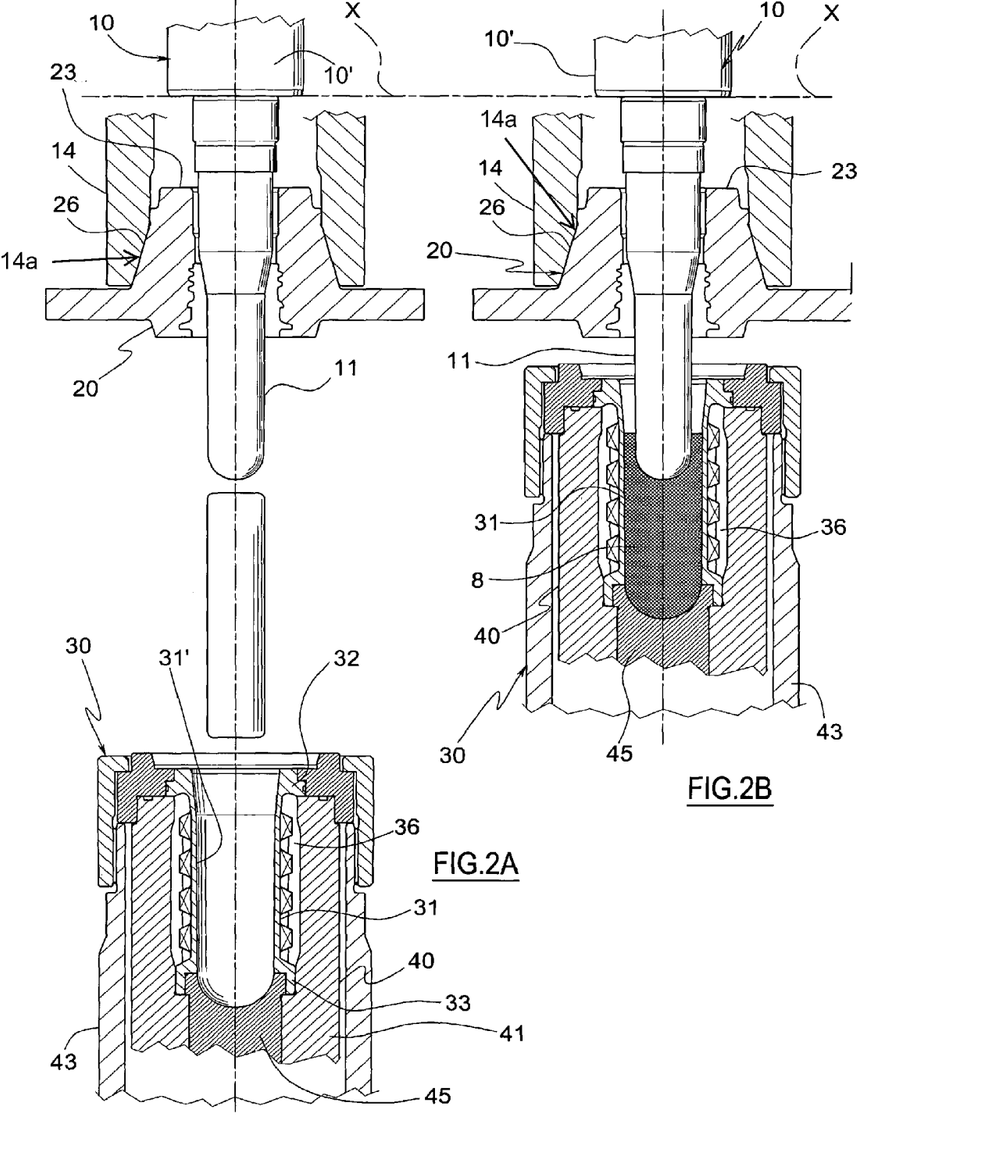
FIGS. 2A-2D show the mold of FIG. 1 in a succession of steps during the molding of the preform.
Figure 2C:
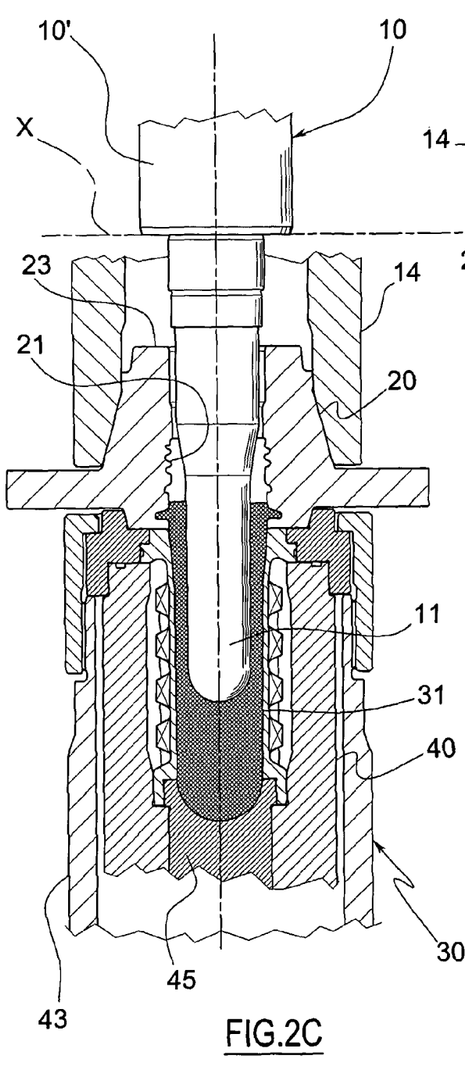

In operation, it is first foreseen (FIG. 2A) to insert in the cavity of the matrix a metered body 8 of polymeric material, whose mass is metered according to a reference value which is established such that, taken into account the error which inevitably exists in the metering of such body, the body 8 itself always fills in a complete manner the volume of the molding chamber 7 of the mold calculated "in unloaded condition" and that the error proves to be an excess of polymeric material with respect to the volume of the chamber itself.

Subsequently, the mutual approaching among the mold components is carried out, for example, following a lifting of the lower matrix part 30, operated through a lower device (not shown in the figures) while the upper body 10, which bears the punch 11, and the punch itself on the other hand remain still.

In the figures from 2A to 2D a horizontal reference axis is indicated with an X, which remains fixed, passing through the lower abutting shoulder of the upper portion 10' of the body 10.

It is nevertheless obvious that that of importance here is the movement related to the mutual approaching; this may be obtained, alternatively, following a downward movement of the upper body 10, possibly together with an upward movement of the lower device which bears the matrix.

First, (FIG. 2B) the punch 11 begins to penetrate into the cavity of the lower matrix part 30, beginning to progressively deform the metering 8.

Subsequently, the upper end of the lower matrix part 30 comes to couple with the lower end of the upper matrix part 20 (position illustrated in FIG. 2C) and the punch 11 continues to penetrate in the cavity of the matrix, continuing to deform the metering 8. The sectors which form the upper matrix part 20 are locked in radially closed position through an upper annular body 14 (of known type) associated to the punch 11 and vertically moving with respect to it, whose lower end portion possesses a concave frustoconical surface 14a, which mates with a complementary outer and upper side surface 26 of the upper matrix part 20, it too of frustoconical shape.

Figure 2D:
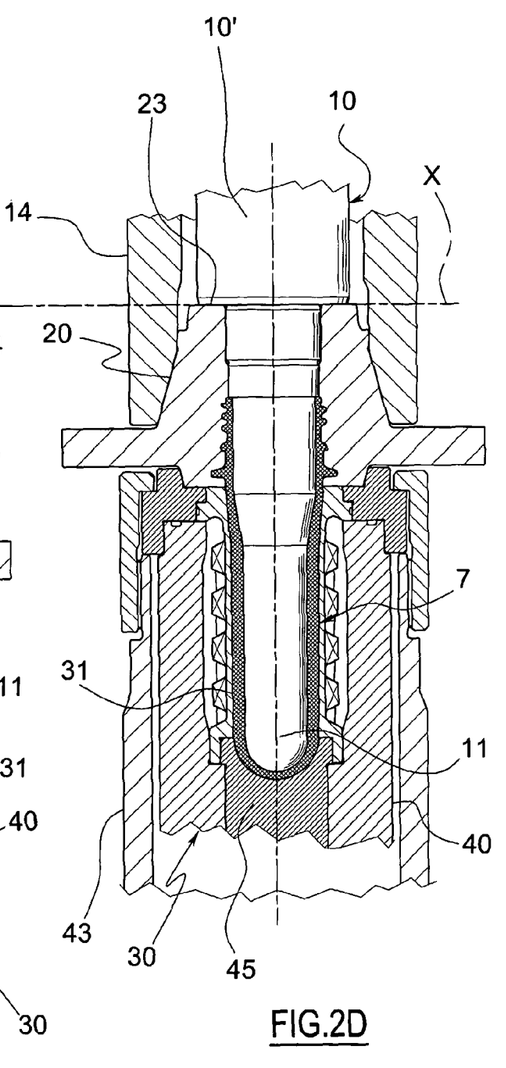

Subsequently, the punch 11 continues to penetrate (always following upward displacements of the lower device which bears the matrix) within the matrix cavity until it produces the complete closing of the mold, which occurs when the two surfaces 12b and 21b are in contact with each other (position shown in FIG. 2D). At this point the penetration of the punch terminates.

During this final molding step of the preform, it occurs that first, when the molding chamber 7 is still not closed, the polymeric material of the metering completely fills such chamber 7, while the deformable wall 31 is not yet deformed, at least in appreciable terms, achieving appropriately high pressure values, in the range of the design values foreseen at the end of the molding. Then, the penetration of the punch continuing further into the matrix cavity until the closing of the mold, since the polymeric material has an excess volume with respect to the volume of the chamber 7, such material, pushed by the pressure produced by the penetration of the punch, causes the elastic wall 31, whose generic axial section is free to bend, not having any constraint other than the abutments provided by the bands 32 and 33, to be elastically deformed with outward radial displacement until said excess volume is absorbed.

The elastic deformation which the deformable wall 31 undergoes is of bending type in the section along a generic axial plane, with displacement of the axially middle zone of the wall itself which bends outward, said displacement being as great as said excess volume of the metering. On the other hand, along the generic transverse plane, the deformation which the elastic wall 31 undergoes, in tubular form according to the first embodiment (FIG. 1A), consists of an increase in the diameter of the tubular wall itself which achieves maximum value in the axially middle zone. The tubular wall 31 is therefore subject to stress composed of elastic bending and traction together. The described deformation of the wall 31 illustrated in FIGS. 1 and 1A, produces a distributed and regular increase of the thickness of the side wall 92a of the hollow body 92 which achieves maximum value in the intermediate zone thereof, while such thickness remains nearly unchanged at the bands 32 and 33 since these are scarcely deformable.

The elastic deformation does not even involve other parts of the matrix, and in particular the upper part 20 which gives shape to the neck 91, which remain instead unaltered.

The error of the mass of the metering with respect to the reference value is therefore distributed in the preform part placed at the deformable wall 31 and hence in the hollow body 92.

The reference value of the mass of the metering 8 is calculated so that taking into account both the error in the formation of the metering 8 and the volumetric shrinkage which occurs in the cooling of the preform during the molding, the complete filling of the molding chamber 7 is realised and moreover such that the polymeric mass is subjected, in the final step of the molding, to a pressure having appropriate design values (on the order of several hundred bar). In particular, it may be foreseen that said reference value is such that the polymeric material of the metering has always a greater volume than the volume of the molding chamber and that therefore the deformable wall 7 always undergoes a deformation, of a more or less significant measure.

For its own part the deformable wall 31 is designed with structural characteristics (in particular the material and the thickness in relation with the length) such that it can be elastically deformed so to absorb the excess volume of the metering and provide at the same time, in virtue of only its own structural characteristics (without the intervention of outside means or actions), a sufficient resistance to elastic deformation to allow that the polymeric material of the metering achieves in the final molding step said design values regarding the pressure, where moreover the deformation of the wall 31 takes place following the complete filling of the molding chamber.

Therefore, the deformable wall 31 shall be sized in relation with several parameters including the force of the molding in play and the size of the errors of the metering. For example, for a preform having a mass of 24 grams, and having a total axial length of 100 mm, it was utilised, in the lower matrix part 30, a deformable wall 31 in stainless steel, with low values of carbon and high values of Mo, Ni, Co and Ti, whose thickness in the central part comprised between two abutments defined by the bands 32 and 33 is approximately 2.5 mm. In the test operation, foreseeing for the mass of the metered body 8 a maximum error of 1%, radial deformations were detected in the wall 31 on the order of 0.02-0.05 mm.

Figure 3:
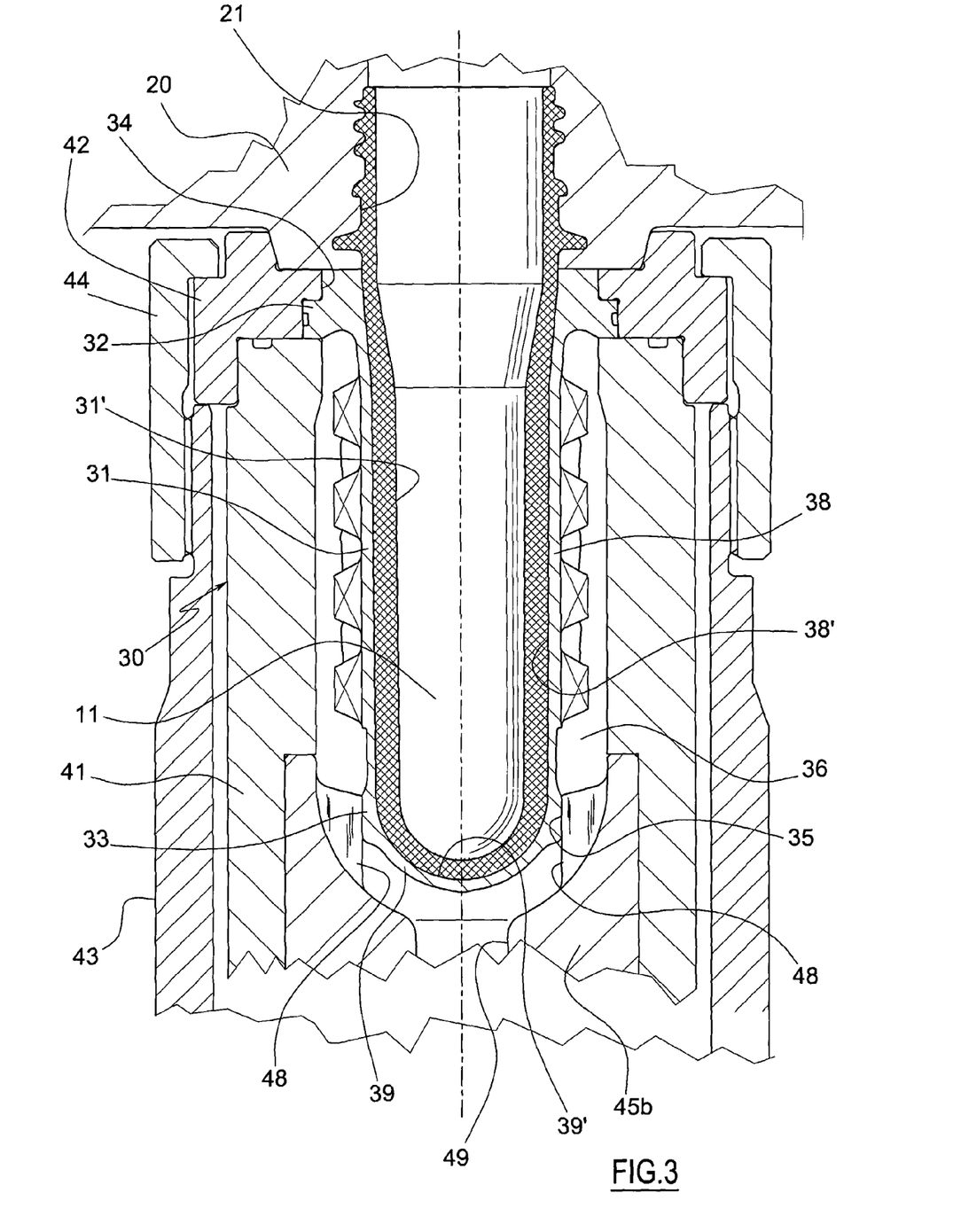
FIG. 3 is an axial section of a second embodiment of the mold according to the invention.

In the second embodiment, illustrated in FIG. 3, the deformable wall 31 comprises a side portion 38 having tubular form (substantially equal to the whole wall 31 of the first embodiment) in particular substantially cylindrical, whose inner surface 38' defines at least in part (and in particular, as illustrated, nearly completely) the outer surface of the side wall 92a of the hollow body 92, and also a bottom portion 39, in the shape of a cap joined in a single body to the side portion 38, whose inner surface 39' defines the outer surface of the bottom wall 92b of the hollow body 92.

This deformable wall 31 has nearly entirely a relatively thin thickness which permits it to be elastically deformed, under the pressure of the polymeric material, both in the side portion 38 and in the bottom portion 39.

The two said circular bands 32 and 33 are present, placed at the respective upper and lower ends of the side portion 38.

The coaxial cavity 36, in this case, also wraps around the bottom portion 39 of the wall 31.

Said lower seat 35, on which abuts the lower band 33, defines a cylindrical abutment surface and is made on a limited number of radial and axial fins 48 which permit the communication between the lower and upper part of the cavity 36.

The abutment between the band 33 and the respective abutment seat 35 permits the axial sliding of the band itself, so to not hinder the axial elastic deformation of the deformable wall 31.

Therefore, also in this second embodiment, as in the first, the deformable wall 31 comprises a deformable tubular portion 38 which has, along the generic axial section, from one side and the other with respect to the axis, two end portions defined by the circular bands 32 and 33, which form abutments which hinder the radial displacement, and a central portion, laminar and having a relatively thin thickness in relation with the axial length, in a single body with the two end portions, free to elastically bend in radial direction, forming an arch in the axial plane. Moreover it also comprises a deformable bottom portion 39 which has, along generic axial section, two end portions, both defined by the circular band 33, and a central portion, having a relatively thin thickness in relation with the length, free to elastically bend in the axial direction.

The cavity 36 is connected, through a lower mouth 49 made in the central body 45b and other not-illustrated conduits, with means adapted to circulate refrigerant fluids capable of removing heat from the preform in a step of thermal conditioning (cooling) of the same.

In operation, this embodiment differs from the preceding for the fact that the pressure exerted by the metering 8 on the inner surface of the molding chamber 7 causes an elastic deformation both of the side portion 38 and the bottom portion 39 of the deformable wall 31 and therefore the error of the metering is apportioned also to the bottom portion 92b, in addition to the side portion 92a of the hollow body 92. Moreover, the deformable wall 31 is subject to both bending and axial elongation deformations.

Figure 4:
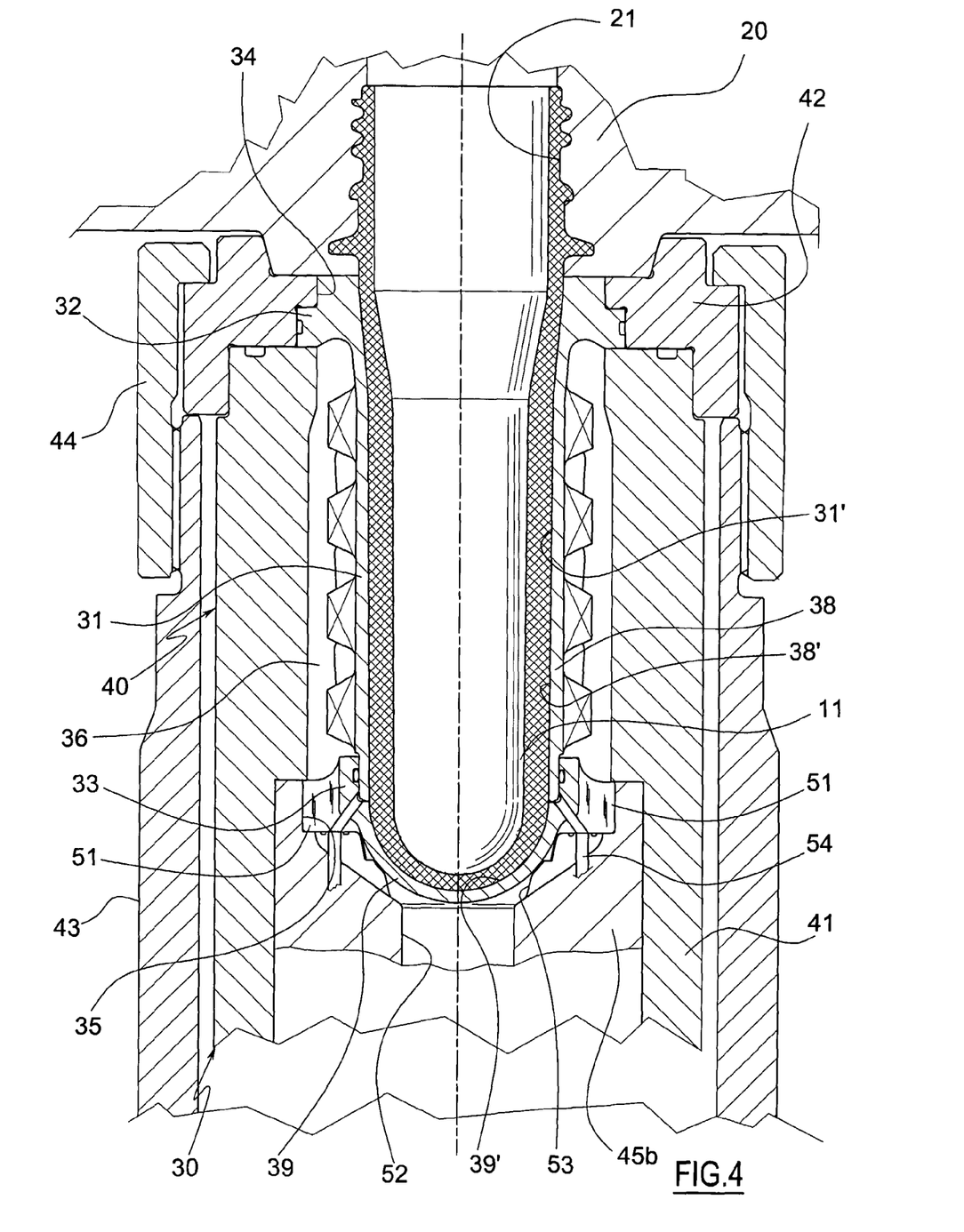
FIG. 4 is an axial section of a third embodiment of the mold according to the invention.

Also in the third embodiment, illustrated in FIG. 4, as in the second, the deformable wall 31 comprises a side portion 38 having tubular form (substantially equal to the whole wall 31 of the first embodiment) in particular substantially cylindrical, whose inner surface 38' defines at least in part (and in particular, as illustrated, almost completely) the outer surface of the side wall 92a of the hollow body 92, and also a bottom portion 39, in the shape of a cap joined to the side portion 38, whose inner surface 39' defines the outer surface of the bottom wall 92b of the hollow body 92. Nevertheless, unlike the second embodiment, this foresees that the two portions 38 and 39 are separated from each other and in any case associated to form a continuity of the respective inner surfaces.

Figure 4A:
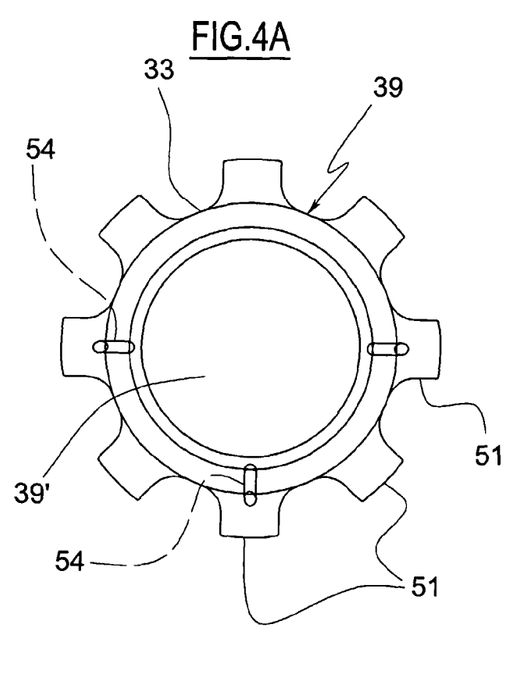
FIG. 4A is the plan view from above of the bottom portion 39 of FIG. 4.

Said lower circular band 33 is made in the upper circular border of the bottom portion 39 and in correspondence thereof the two portions 38 and 39 are mutually fixed. The band 33 has a series of radial-axial ribs 51 whose free radial ends define a cylindrical surface which abuts against the lower seat 35, it too cylindrical.

Here too, as in the preceding embodiment, the coaxial cavity 36 also wraps around the bottom portion 39 of the wall 31 and the lower seat 35, and the ribs 51 permit the communication between the lower part of the cavity 36 and the upper part thereof.

In particular, inside the tubular body 41 there is a central body 45b whose upper surface is placed a distance from the lower surface of the bottom portion 39.

The abutment between the band 33 and the respective abutment seat 35 permits the axial sliding of the band itself, so to not hinder the axial elastic deformation of the deformable wall 31.

The cavity 36 is connected, through a lower mouth 52 made in the central body 45b and other not-illustrated conduits, with means adapted to circulate refrigerant fluids in the cavity 36 itself capable of removing heat from the preform in a step of thermal conditioning (cooling) of the same. In the lower part of the cavity 36, below the abutment ribs 51, there are several fins 53 projecting upward from the central body 45b, adapted to better direct the flux of the refrigerant fluid, and which do not hinder the deformation of the wall 31 with which they do not come into contact. Also in this third embodiment, the error of the metering is apportioned also to the bottom portion 92b, in addition to the side portion 92a of the hollow body 92.

There may moreover be foreseen several conduits 54, made in the support body 40, in particular in the central body 45b and in the fins 53, which cross the ribs 51 and the lower band 33, which lead in correspondence with the surfaces of mutual connection between the lower end of the side portion 38 and the upper end of the bottom portion 39.

Said conduits 54 may be advantageously connected with suction means in order to clear the air present in the cavity of the mold before and during the compression step of the metering.

Moreover, or alternatively, the conduits 54 may be advantageously connected with means adapted to inject air or another thermally conditioned fluid inside the cavity, before the opening step of the mold, to favour the cooling and the detachment of the preform after its molding.

The fourth embodiment (FIG. 6) consists of a variation of the first embodiment (FIGS. 1 and 1A) in which the central body 45 was modified according to the teaching of the invention described in the patent application n. PCT/IB2005/002303 (claiming the priority of the Italian patent application n.RE2004A000128 of the same Applicant), mainly in order to increase the capacity of the matrix to receive the metering. In particular, the central body 45 is realised so to comprise a first component body 451 and a second component body 452, situated centrally with regards to the first, having respectively inner surfaces 453 and 454 which may be aligned in a complementary manner to define, together, the inner surface 45'.

The first component body 451 is integrally fixed to the remaining lower matrix part, in particular it is integrally fixed to the body 41. The second component body 452 is movable with respect to the first component body 451 between an upper position (illustrated with a continuous line in FIG. 6) in which its inner surface 454 is placed in aligned or nearly aligned position with the inner surface 453 of the first component body 451 and a back position (illustrated with a dashed line in FIG. 6) in which its inner surface 454 is placed a distance from the inner surface of the first component body in order to increase the volume of the cavity of the lower part of the matrix. Finally, operation means are foreseen (not illustrated in the figures) adapted to arrange said second component body in said back position in the loading step of a metering of polymeric material in the cavity of the lower matrix part 30 and to bring it to the upper position in the molding step.

Figure 6:
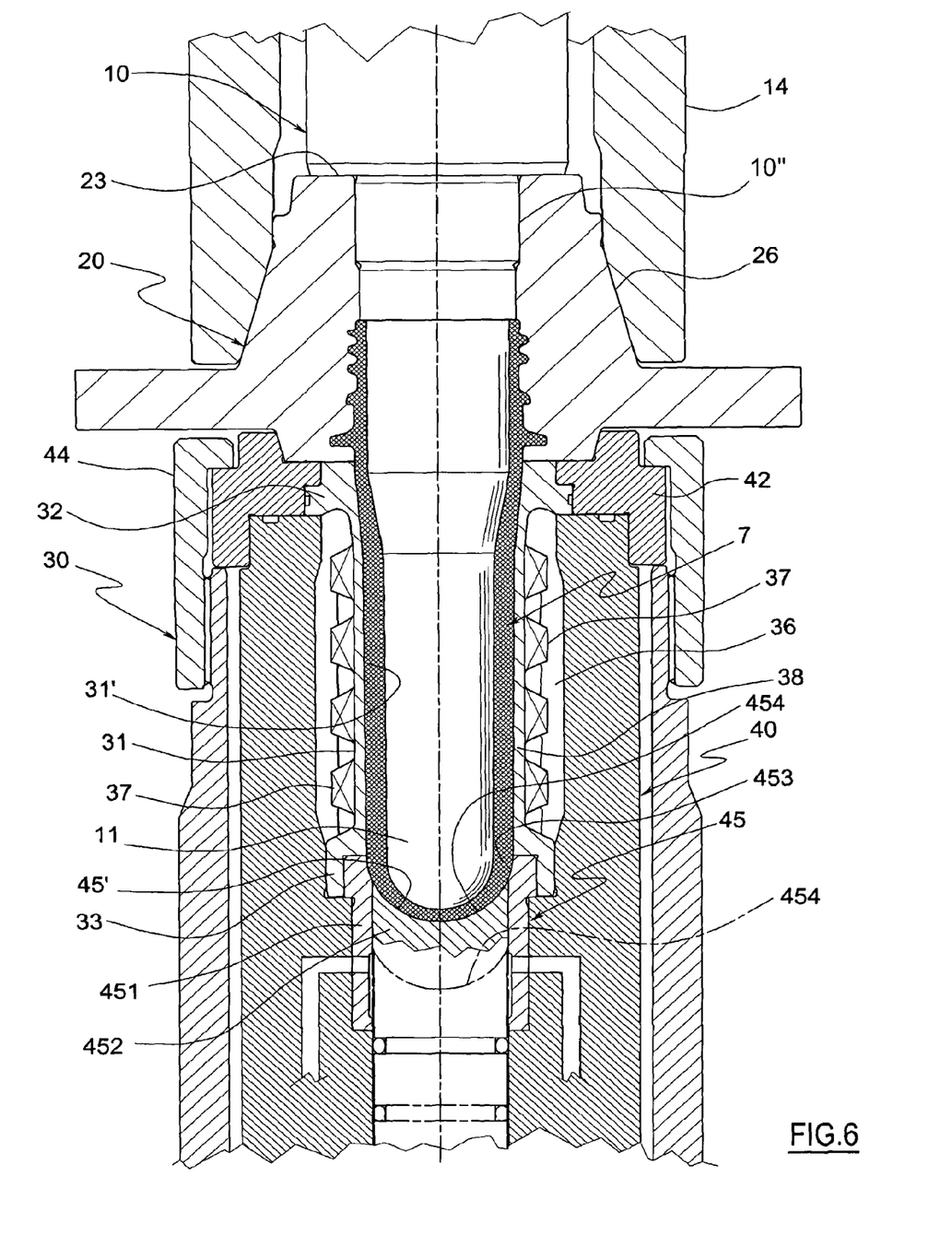
FIG. 6 is an axial section of a fourth embodiment of the mold according to the invention.

In operation, first a metering is formed outside of the mold and then inserted in the cavity of the lower matrix part, while the second component body 452 is in said back position.

Subsequently, the progressive insertion of the punch in the matrix cavity is carried out until the closing of the mold, with modalities equal or similar to those described above with reference to the FIGS. 2A to 2D, while the second component body 452 is maintained in said back position.

Once the complete penetration of the punch 11 in the matrix cavity is realised until the closing of the mold (in which the lower matrix part 30 is coupled with the upper part 20 and the two surfaces 12b and 21b are in mutual contact), the upward displacement is produced of the second component body 452 until it reaches the upper position. This final step may begin after the closing of the mold, or a little before.

In this last step, the polymeric material is pushed to completely fill the molding chamber and then to deform the elastic wall 31, thereby increasing the thickness of the hollow body, until the excess volume of the metering is absorbed.

The upper position does not necessarily coincide with the position in which the surface 454 of the second component body 452 represents the exact geometric continuation of the surface 453 of the other component body 451 ("nominal position" of design) but is separated from this in a variable manner, in relation with a level of error of the mass of the metering. This upper position may therefore result below said "nominal position".

According to a further embodiment (not shown in the figures) it is foreseen that said deformable inner wall 31 comprises only the bottom portion and that therefore the error of the metering is apportioned only to the bottom portion 92b of the hollow body 92.

According to the invention, the preform, after its molding, is cooled and subsequently subjected to a process of deformation through stretch blow molding in which the hollow body is newly heated, until the desired shape of the container is achieved. Alternatively, the preform is subjected to the process of deformation through stretch blow molding while the temperature of its hollow body is still sufficiently hot.

Thanks to the invention, firstly, the error of the mass of the metering is distributed in a continuous manner and over a relatively quite wide surface such that no trace is left in the exterior aspect of the final containers which are obtained at the end of the entire process; nor is it possible to perceive, in practice, size variations between one final container and the other.

Moreover, after the molding of the preform, the possible further tensions which form in the distribution of the error of the metered body in the hollow body are eliminated with the hollow body's subsequent heating; or else such tensions do not even form since the temperature of the hollow body is maintained sufficiently high and the mass is maintained in a more or less viscous fluid state.

The fourth embodiment (FIG. 6) increases the volume of the cavity of the lower matrix part, with respect to that of a traditional mold, in the step in which it receives the metering, and thus renders such cavity capable of receiving metered bodies having higher mass and/or height than would otherwise be receivable. Moreover, it renders possible the compensation of relatively greater mass errors, thanks to the fact that to the compensation which is obtained through the elastic deformation of the elastic wall 31 a compensation may be added, obtained by ensuring that the upper position of the component body 452 does not exactly coincide with said "nominal position", but is separated from this to compensate for at least a part of the metering error.

The invention claimed is:

1. Method for making concave objects in polymeric material, comprising:
   compression molding of preforms comprising an upper neck which maintains the same form of the final concave object and a hollow body, joined to the neck, and
   the subsequent deformation treatment of the hollow body under hot temperature wherein the hollow body is dilated to assume a greater capacity and a correspondingly reduced thickness;
   wherein the compression molding of preforms comprises:
   providing a mould having a matrix comprising a first matrix part (20) to form the outer surface of the upper neck (91) and a second matrix part (30) to form the outer surface of the hollow body (92), and a punch to form the inner surface of the preform, the second matrix part (30) comprising a deformable wall (31);
   inserting a metered mass body of polymeric material within a matrix cavity, the reference mass value of the metered body being calculated such that an error results as an excess mass of polymeric material, and
   pressure inserting the punch into the matrix cavity with progressive penetration movement of the punch relative to the matrix until, at the end of the penetration movement, punch (11) and the matrix cavity give rise to a molding chamber (7) which confers the desired shape to the preform (9),
   wherein, in the penetration final step, the polymeric material completely fills the matrix cavity, and thereafter, further punch penetration movement relative to the matrix causes a pressure increase of the polymeric material, which pressure increase causes the elastic deformation of said deformable wall (31), thereby increasing the thickness of the entire perimeter of the hollow body transversal section, and absorbing the excess mass error of the metered mass body.

2. Method according to claim 1, wherein after the molding of the preform, the hollow body is subject to a cooling and to a subsequent heating and deformation treatment the hollow body achieves the final shape.

3. Method according to claim 1, wherein in the molding of the preform, a side portion (38) of the elastic wall (31) having tubular form, is elastically deformed to distribute the excess of the metered mass body, at least in part, in the side wall (92a) of the hollow body (92).

4. Method according to claim 3, wherein in said final step of the punch penetration, the polymeric material of the metered body completely fills the molding chamber (7) and the volume of the excess polymeric material, pushed by the penetration of the punch, causes the pressure value of the polymeric material to reach a value substantially equal to a pre-established value, in the range of the design values foreseen at the end of the molding, by virtue of the resistance to elastic deformation produced by deformable wall (31) without the intervention of means or actions other than that of the punch.

5. Method according to claim 3, wherein in the molding of the preform at least part of the inner surface of the matrix is elastically deformed with respect to its position "in unloaded condition", in such a way to increase the length of the hollow body so to absorb the excess of polymeric material.

* * * * *